Figure 1:
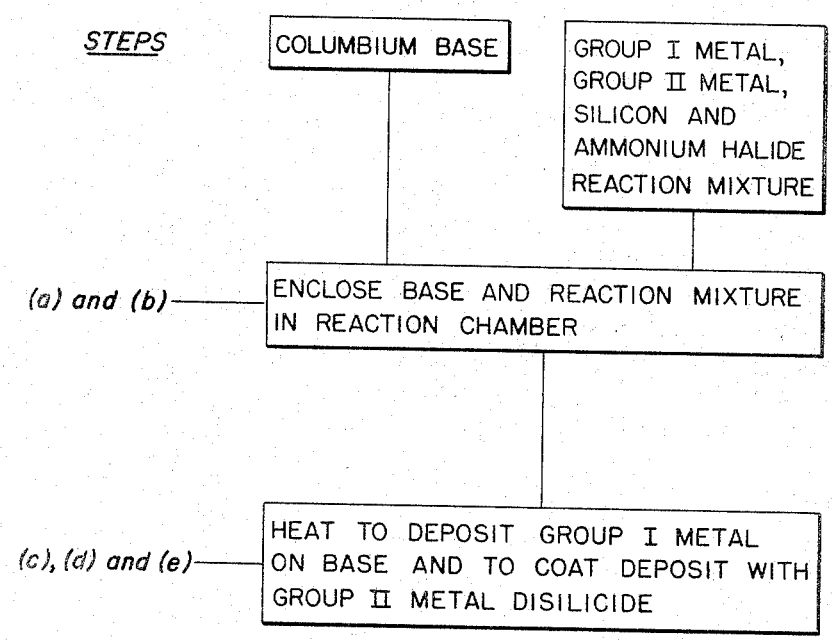

3,337,363
HIGH TEMPERATURE COATINGS FOR COLUMBIUM ALLOYS
Pao Jen Chao, Scottsville, N.Y., and Janez Zupan, Columbus, Ohio, assignors to Ritter Pfaudler Corporation, a corporation of New York
Filed Mar. 15, 1965, Ser. No. 440,006
4 Claims. (Cl. 117—106)

This application is a continuation-in-part of application for U.S. Letters Patent 167,935 filed Jan. 22, 1962, now abandoned and relates to high temperature oxidation resistant coatings for columbium and methods for applying the same and more particularly to single cycle multi-component cementation-diffusion coatings for columbium, one object being the provision of a more satisfactory coating of this nature.

Columbium has come into increasing use for structural components for use at elevated temperature. It has proven very satisfactory for this purpose because of its high melting point, its great strength to weight ratio at and even above 2600° F., and its superior workability when compared to molybdenum and other refractory metals usable at temperatures in this range. However, many of these applications for such high temperature metals require resistance to oxidation; and columbium oxidizes rapidly in contact with air at the temperatures mentioned above. Some improvement in the oxidation resistance of columbium has been attained by alloying, but the results achieved by this method have so far proved to be unsatisfactory for any extended use at temperatures approaching 3000° F. in contact with an oxygen containing atmosphere. For this reason, it is desirable to provide a high temperature oxidation resistant coating which can be applied to the surface of columbium and columbium alloys which will prevent oxidation of such alloys at elevated temperatures. The provision of such coating is the primary object of this invention.

Many high temperature coatings have been applied to columbium and the alloys, but all have proven to have only limited usefulness in practice. Ceramic coatings have been applied, but have been found to be generally unsatisfactory because of their brittleness, porosity and the difficulty encountered in adherence, particularly where complex shapes are involved. Electro-deposited coatings have not proven satisfactory generally because only certain metallic substances can be deposited by this method, and in general, electro-deposited alloys do not, in themselves, have sufficient high temperature oxidation resistance to adequately protect columbium at the temperatures ranging over 2000° F. Plasma arc spray coatings, diffusion coatings, flame spray coatings, hot dip coatings and others have also been investigated and have proven to be unsatisfactory.

Vapor deposited pack cementation-diffusion coatings have also been applied to columbium but those heretofore in use have also not proven to be particularly satisfactory, mainly because the metals that have been deposited do not form a sufficiently oxidation resistant coating at the temperature involved. In particular, the deposition of silicon has been used to form oxidation resistant high temperature refractory coatings. As the silicon diffuses into the columbium surface, columbium silicides are formed, which have a measure of oxidation resistance. However, columbium silicides are unsatisfactory for extended exposure to oxygen or air at temperatures above 2000° F.

Among the refractory silicides, molybdenum disilicide, tungsten disilicide and tantalum disilicide are well known for their high degree of oxidation resistance at elevated temperatures. However, all previous attempts to deposit these refractory silicides onto columbium, either alone, or in combination, have met with failure, principally because the silicon diffuses into the columbium base metal, while the columbium base metal diffuses into the coating. Both effects are deleterious to the refractory coating, since the removal of the silicon from the coating by diffusion into, and combination with the columbium base metal prevents the formation of the oxidation resistant molybdenum, tungsten or tantalum higher silicides, and causes the formation of the less refractory and less oxidation resistant lower silicides. Moreover, the diffusion of the columbium base metal into the coating causes the formation of columbium silicides which, as pointed out above, are in themselves insufficiently oxidation resistant.

It is an object of this invention to overcome the problems outlined above in the deposition of tungsten, tantalum and molybdenum disilicides on columbium and columbium base alloys by prevention of this inter-diffusion. This is accomplished by partially immobilizing the columbium by tying it up in intermetallic compounds with certain alloying agents, and at the same time so reducing the concentration of the columbium at or near the surface of the base so that there will be less tendency for it to diffuse outwardly into the coating. These objects must, of course, be carried out without introducing into the coating system any material which will appreciably degrade its oxidation resistance at high temperatures.

Briefly stated, we have found that superior diffusion coatings, consisting predominately of disilicides of tungsten, molybdenum and tantalum, hereinafter referred to as Group II metals, may be formed by including within the coating batch one or more elements selected from the group consisting of chromium, hafnium, titanium, and zirconium, hereinafter referred to as Group I metals. FIG. 1 shows the general process of the invention.

According to diffusion theories, diffusion rates vary inversely with (a) the melting points of the diffusing elements, and (b) their degree of solid solubility with the material into which they are being diffused. The Group I elements disclosed herein have lower melting points than the Group II elements and exhibit less tendency to form solid solutions with columbium than Group II elements. Therefore Class I elements will diffuse more rapidly than Group II elements under the same conditions. In addition, the chemical affinity of Group I elements for silicon is less than that of Group II elements. Further, Class I elements tend to form complete series of solid solutions with Group II elements, thus the diffusities between elements of the two groups are relatively low.

The net effect of the above factors is that simultaneous deposition of Group I and Group II elements upon a columbium surface under diffusion conditions results in a preferential diffusion of Group I elements into the columbium, a preferential combining of Group II elements with silicon and a low rate of interdiffusion between the Group I elements and the Group II elements. It should be noted that the use of the various Group I metals, singly or in combination, does not have any serious adverse effects on the quality of the coatings, if excessive amounts are not used. The silicides formed incidentally by the Group I metals are in themselves relatively ductile and oxidation resistant.

It has been found that chromium forms a definite intermetallic compound with columbium, i.e., $CbCr_2$, which has a considerable degree of stability. Once this intermetallic compound is formed, the columbium is immobilized and no longer readily available for diffusion into the surface layer or for combining with silicon. In large measure this prevents the formation of undesirable columbium silicides and assures that sufficient silicon will be available for forming the desirable disilicides. Further adding to the value of chromium as a Group I metal is its ability to form a complete series of solid solutions with molybdenum, tungsten and tantalum. This serves to prevent diffusion of the chromium outwardly, and thus the contamination of the desirable disilicides by chromium silicides will be relatively small. Because of the extent to which chromium possesses the properties set forth above, it is the preferred Group I metal and further discussion will be directed toward an embodiment including chromium as a preferred, but also an illustrative and typical Group I metal.

The high temperature oxidation resistant coatings as embodied in the present invention are preferably applied by the pack cementation process, although it is also contemplated that the fluidized bed vapor cementation process or other similar processes might be used. In the pack cementation process, the objects to be coated are packed in a mixture comprising the coating materials, either in the elementary form or in the form of active compounds which will supply the elementary coating material at the temperature at which the process is carried out. In practice, the respective metallic powders are used which will initially react with an ammonium halide to form a metallic halide vapor which, when it comes into contact with the heated surface of the object to be coated, will decompose, depositing the desired metal on the surface of the object. This process is well known in the art and need not be described in detail. About 1.5 to 2% by weight of an ammonium halide is suitable for present use.

The reaction rates involved in this process, including the rates of formation of the metallic halides, and the reduction and decomposition thereof on the surface of the object to be coated, are controlled by the temperature at which the reaction is carried out. However, certain of the reactions, particularly the formation of the various metal halides, take place at a maximum rate at different temperatures: for example, the maximum rate of formation of chromic halides takes place at lower temperatures than the maximum rate of formation of tungsten, molybdenum and tantalum halides. For this reason, the steps of the process are preferably carried out at a lower temperature, favoring the optimum formation of chromic halides. This causes preferential formation of chromic halides at the expense of tungsten and molybdenum halides resulting in the rapid initial deposition of chromium as well as a rapid depletion of the chromium in the batch. This forms an initial first layer which is relatively chromium rich for combination with the columbium substrate, which has desirable effects which were discussed above.

After the initial preferential deposition of chromium depleting the chromium in the batch, mass action effects cause a change in the composition of the metal being deposited, which becomes relatively richer in the Group II metals tungsten, molybdenum and tantalum, and in silicon. If the composition of the batch is properly adjusted, this reaction can be controlled to deposit a coating having composition close to the desired stoichiometric ratios to form molybdenum disilicide, tungsten disilicide or tantalum disilicide. The small amount of chromium remaining is also deposited at this stage, forming chromium silicide. While this is not desirable, a small amount of chromium silicides has very little deleterious effect since these silicides are ductile and have considerable oxidation resistance.

It is, of course, possible to carry out this deposition at a series of different temperatures to further control the reactions occurring therein. For example, it is possible to carry out the initial deposition at a low temperature which would heavily favor the initial deposition of chromium and depletion of this element and then, after a predetermined interval, to raise the temperature to favor the deposition of tungsten, molybdenum and/or tantalum disilicides. However, it has been found that this is usually not necessary because good results can be obtained at one favorable temperature range and the automatic interposition of the mass action effect brought about by the relative depletion of the chromium concentration in the batch changes the deposition reaction rates sufficiently to provide the desired change in the composition of the metals deposited.

The desired effect is the initial immobilization of the columbium in the base to prevent contamination of the coating with columbium and/or columbium silicides. Moreover, this immobilization of columbium serves to prevent the undesirable tying up of silicon by the columbium so that the desired quantity of silicon is present to form the oxidation resistant, refractory high molybdenum, tungsten or tantalum silicides rather than the unstable lower silicides. The initial heavy deposition of chromium is effective for this purpose.

It has also been found that the coatings made by the process disclosed herein can be improved by the addition of small amounts of other metallic elements. In particular, the addition of aluminum, manganese and mixtures thereof is, in certain cases, desirable. These metals tend to concentrate at the grain boundaries of the columbium near the surface and act as barriers which will prevent, in large measure, the diffusion of oxygen into the base alloy. The presence of these metals therefore has two desirable effects. The first is that it minimizes the deleterious effects of any oxygen which may remain in the atmosphere during the coating process by preventing the diffusion thereof into the substrate and, after the coating it completed it renders it more impervious to atmospheric oxygen during use. For this reason, it is often desirable to add one or more of the above metals to the composition in an amount up to 10%.

In the pack cementation process, the objects to be coated are packed in a mixture comprising the coating materials, an inert filler material, and an atmosphere control compound capable of forming inert or reducing gases when heated for displacing air and producing a reducing or at least a nonoxidizing atmosphere to protect the objects during the coating process. The objects to be coated are embedded in the mixture, contained in a retort or reaction chamber. The retort is then sealed with a suitable sealing compound which will become fluid at operating temperature to form a liquid seal which will allow the escape of gases. The melting point of this sealing material should be adjusted so that it will solidify at a temperature slightly below operating temperature to prevent the re-entry of air during the cooling cycle to prevent oxidation of the coating materials. Useful operating temperatures are in the range from 1750° F. to 2300° F.

In the vapor phase deposition cementation process, the object is suspended in a retort or reaction chamber, and the coating materials, which are the same as those used in the pack cementation process with the exception of the inert filler, are placed in the retort in a position where the gases produced by their decomposition will come into contact with the object to be coated. The active ingredients can either be placed directly in the retort, or in an auxiliary chamber having a suitable connection with a retort. In either case, it is preferable to evacuate the retort in advance to exclude atmospheric oxygen although where sufficient atmosphere control compound is used, the oxygen will be washed out and scavenged by the inert and/or reducing gases produced. The following examples are presented to more specifically illustrate the practice of this invention.

*Example I*

A coating mixture was prepared by intimately mixing the following finely divided materials. The percentages given are by weight:

| | Percent |
|---|---|
| Si | 15 |
| Cr | 10 |
| Mo | 10 |
| $NH_4Cl$ | 2 |
| $CO(NH_2)_2$ | 0.5 |
| $Al_2O_3$ | Balance |

The coating mixture was then placed in a reaction chamber and a columbium metal article was embedded within the coating mixture in a manner such that the coating mixture was in intimate contact with every exposed area of the object.

The charged reaction chamber was sealed with a mixture of ceramic materials having a melting point slightly below the operating temperature (2050° F.). The reaction chamber was gradually heated to 2050° F., fusing the ceramic materials enroute to form a fluid seal. The temperature of 2050° F. was maintained for six (6) hours, after which the chamber was cooled.

The columbium article was observed to have a smooth continuous coating thereon, that upon analysis was found to be predominately molybdenum disilicide.

*Example II*

The following batch mixture was prepared as in Example I:

| | Percent |
|---|---|
| Si | 17 |
| Ti | 3 |
| Mo | 8 |
| W | 10 |
| $NH_4Cl$ | 1.5 |
| $CO(NH_2)_2$ | 0.5 |
| $Al_2O_3$ | Balance |

A columbium metal article was packed as shown in Example I and heat-treated for 8 hours at 2150° F.

The article was observed to have a coating predominately comprising molybdenum disilicide and tungsten disilicide.

*Example III*

The following batch mixture was prepared as in Example I:

| | Percent |
|---|---|
| Si | 15 |
| Zr | 5 |
| Mo | 14 |
| $NH_4Cl$ | 2 |
| $CO(NH_2)_2$ | 0.5 |
| $Al_2O_3$ | Balance |

A columbium metal article was packed as shown in Example I and heat-treated for 6 hours at 2050° F.

The article was observed to have a coating predominately comprising molybdenum disilicide.

*Example IV*

| | Percent |
|---|---|
| Si | 15 |
| Hf | 7 |
| Mo | 12 |
| $NH_4Cl$ | 2 |
| $CO(NH_2)_2$ | 0.5 |
| $Al_2O_3$ | Balance |

A columbium metal article was packed as shown in Example I and heat-treated for 6 hours at 2150° F.

The article was observed to have a coating predominately comprising molybdenum disilicide.

The article was observed to have a coating predominately comprising tungsten disilicide and tantalum disilicide.

In the above examples various combinations of Group I and Group II metals have been set forth. However, these examples are meant to be illustrative and not limiting. Generally speaking, the practice of the invention requires that silicon be present in the range 5% to 20%, one or more Group I metals be present in the range 2% to 20% and one or more Group II metals be present in the range 2% to 25%.

The heat-treatment of the metals disclosed herein is preferably effected at a temperature ranging from 1750° F. to 2300° F. for a period of from 3 to 12 hours. For special purposes these may be altered as will be clear to those skilled in the art.

The urea used for control of the atmosphere within the retort will decompose at approximately 270° F. forming biuret and ammonia. Ammonia is reducing in character and biuret further decomposes, forming further gases which will protect the object to be coated and will flush any residual air or oxygen out of the retort. Any excess pressure built up by these gases can escape through the molten seal as described below. However, sufficient of this material must be present so that the object to be coated is protected throughout the entire duration of the process so that oxidation cannot occur before the coating is fully formed.

In the above processes, the ammonium chloride decomposes to provide hydrogen chloride and chlorine, which react with the elementary silicon, molybdenum, tungsten, chromium and other metals to provide decomposable and reducible metal halide vapors, e.g. $SiCl_4$, $MoCl_5$, $WCl_6$ and $CrCl_2$. These metal halide vapors will come in contact with the object to be coated and will be decomposed and reduced to deposit the coating metals and to liberate elementary halogens, e.g. chlorine. These elementary halogens then react with the elementary coating metals to form more metal halide vapors and thus the deposition continuously takes place. The inert filler material, $Al_2O_3$, is provided in order to allow passages for the gaseous reactions, to prevent conglomeration of active ingredients, and to provide an even support for the object to be coated so that the reaction takes place smoothly at a controlled rate on all surfaces of the object to be coated to assure uniform coating on all surfaces of the substrate.

It has been found that applying cementation coating on columbium by the above method, problems of hydrogen embrittlement and nitride formation associated with the use of ammonium chloride have not posed a serious problem. It had been feared by many workers in this field that hydrogen would be occluded by columbium during this process. However, since columbium is an exothermic occluder for the hydrogen, its capacity to take up hydrogen decreases rapidly as the temperature is raised to the process temperatures. The columbium therefore is essentially de-gased after remaining for an appreciable time at this temperature and thus the hydrogen embrittlement has not posed a problem. Moreover, columbium nitrides form at very high temperatures and therefore, under the process conditions set forth herein, nitride formation is sufficiently slow so that it does not substantially interfere with the coating process.

While we have shown and described the preferred form of mechanism of our invention it will be apparent that various modifications and changes may be made therein, particularly in the form and relation of parts, without departing from the spirit of our invention as set forth in the appended claims.

We claim:

1. A single cycle diffusion process for applying a refractory coating to columbium and columbium alloy articles comprising the steps of:

(a) enclosing said articles in a reaction chamber;
(b) exposing said articles to a mixture comprising a source of silicon, a source of a first metal selected from the group consisting of chromium, hafnium, titanium, zirconium and mixtures thereof forming a stable compound with columbium, a source of at least one second metal selected from the group consisting of molybdenum, tantalum, tungsten and mixtures thereof; that will combine with silicon to form a stable, refractory coating and an ammonium halide;
(c) heating said mixture to a temperature within the range of 1750° to 2300° F. favoring a preferential deposition of said first metal on said articles for stabilizing the surface of said articles;
(d) maintaining said mixture at said temperature until said first metal is substantially deposited; and
(e) maintaining said mixture at a temperature within the range of 1750° to 2300° F. that will cause a deposition of said second metal to form a stable refractory oxidation resistant disilicide coating.

2. The process of claim 1 wherein said first metal is chromium.

3. A single cycle diffusion process for applying a refractory coating to columbium and columbium alloy articles comprising the steps of:
(a) enclosing said articles in a reaction chamber;
(b) exposing said articles to a mixture comprising:
(1) 5–20% silicon;
(2) 2–20% of a first metal selected from the group consisting of chromium, hafnium, titanium, zirconium and mixtures thereof; and
(3) 2–25% of a second metal selected from the group consisting of molybdenum, tantalum, tungsten and mixtures thereof;
(4) 1.5–2% of an ammonium halide; and
(5) inert material;
(c) heating said mixture to a temperature within the range of 1750° to 2300° F. favoring a preferential deposition of said first metal on said articles for stabilizing the surface of said articles;
(d) maintaining said mixture at said temperature until said first metal is substantially depleted; and
(e) maintaining said mixture at a temperature within the range of 1750° to 2300° F. that will cause a deposition of said second metal to form a stable refractory oxidation resistant disilicide coating.

4. The process of claim 3 wherein said first metal is chromium.

References Cited
UNITED STATES PATENTS

| | | | |
|---|---|---|---|
| 3,015,579 | 1/1962 | Commanday et al. | 148—6.3 |
| 3,037,883 | 6/1962 | Wachtell et al. | 117—107.2 |
| 3,061,462 | 10/1962 | Samuel | 117—107.2 |
| 3,117,846 | 1/1964 | Pao Jen Chao | 29—195 |

ALFRED L. LEAVITT, *Primary Examiner.*

JOSEPH B. SPENCER, *Examiner.*

R. S. KENDALL, *Assistant Examiner.*